(12) United States Patent
Reed et al.

(10) Patent No.: US 7,955,001 B2
(45) Date of Patent: Jun. 7, 2011

(54) TAPERED ROLLER BEARING WITH IMPROVED CAGE

(75) Inventors: Martin Earl Reed, Chester, VA (US); Michael Mason, Richmond, VA (US)

(73) Assignee: Amsted Rail Company, Inc., Granite City, IL (US)

( * ) Notice: Subject to any disclaimer, the term of this patent is extended or adjusted under 35 U.S.C. 154(b) by 421 days.

(21) Appl. No.: 12/288,296

(22) Filed: Oct. 20, 2008

(65) Prior Publication Data

US 2010/0098369 A1  Apr. 22, 2010

(51) Int. Cl.
*F16C 33/46* (2006.01)
(52) U.S. Cl. .................... 384/580; 384/571
(58) Field of Classification Search .......... 384/571, 384/572, 576, 580
See application file for complete search history.

(56) References Cited

U.S. PATENT DOCUMENTS

| | | | | |
|---|---|---|---|---|
| 3,477,773 | A * | 11/1969 | Ralph | 384/576 |
| 4,462,643 | A * | 7/1984 | Gilbert et al. | 384/576 |
| 5,118,207 | A * | 6/1992 | Ikejiri et al. | 384/527 |
| 5,590,225 | A * | 12/1996 | Aramaki et al. | 384/527 |
| 7,534,047 | B2 * | 5/2009 | Reed | 384/477 |
| 2006/0104560 | A1 * | 5/2006 | Kono et al. | 384/572 |
| 2007/0230851 | A1 * | 10/2007 | Matsuyama et al. | 384/565 |
| 2007/0293607 | A1 * | 12/2007 | Arakawa et al. | 524/100 |

* cited by examiner

*Primary Examiner* — Thomas R Hannon
(74) *Attorney, Agent, or Firm* — Edward J. Brosius

(57) ABSTRACT

A bearing assembly is provided having a roller bearing with an inner race fitted around the journal portion of an axle. An outer raceway combines with the inner raceway to receive roller elements. A backing ring is centered to the shaft fillet. Tapered roller elements are located between and contact the inner and outer raceways. A cage is comprised of an inner ring, and outer ring, and a plurality of pocket bars and support pocket bars extending between the inner and outer rings. The support pocket bars have an overall greater thickness than the pocket bars. The cage is a generally unitary structure comprised of a nylon resin material with a fiber fill.

16 Claims, 2 Drawing Sheets

TAPERED ROLLER BEARING WITH IMPROVED CAGE

BACKGROUND OF THE INVENTION

This invention relates to tapered roller bearings and more particularly to an improved cage for such tapered roller bearings for use in a railcar.

Roller bearing assemblies incorporating two rows of tapered roller bearings preassembled into a self-contained, pre-lubricated package for assembly onto journals at the ends of axles or shafts are known. Such bearing assemblies are used as rail car bearings assembled onto journals at the ends of the car axles. Bearings of this type typically employ two rows of tapered roller bearings fitted one into each end of a common bearing cup with their respective bearing cones having an inner diameter dimensioned to provide an interference fit with the shaft journal and a cylindrical sleeve or spacer positioned between the cones providing accurate spacing on the journal. A cage keeps the tapered roller bearings in each row spaced from each other and properly aligned. Seals mounted within each end of the bearing cup provide sealing contact with wear rings bearing against the outer ends of the respective bearing cones at each end of the assembly.

In a typical rail car installation, the axle journal is machined with a fillet at the inboard end, and a backing ring having a surface complementary to the contour of the fillet and an abutment surface for engaging the inboard end of the inner wear ring accurately positions the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft.

SUMMARY OF THE INVENTION

The tapered roller bearing assembly includes an inner race or cone fitted around the journal portion of the axle or shaft. The inner race includes an outwardly directed raceway. An outer race or cup has an inwardly directed raceway. Roller elements are located between and contacting the inner and outer raceways. A cage is a unitary structure that keeps the roller elements spaced from each other and aligned. The cage is comprised of a nylon or a polymer, with fiber filler material and has an improved design with strengthened support pocket bars.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft. An annular wear ring is interposed between and engages the inner race and the backing ring.

DESCRIPTION OF THE PREFERRED EMBODIMENTS

Figure 1:
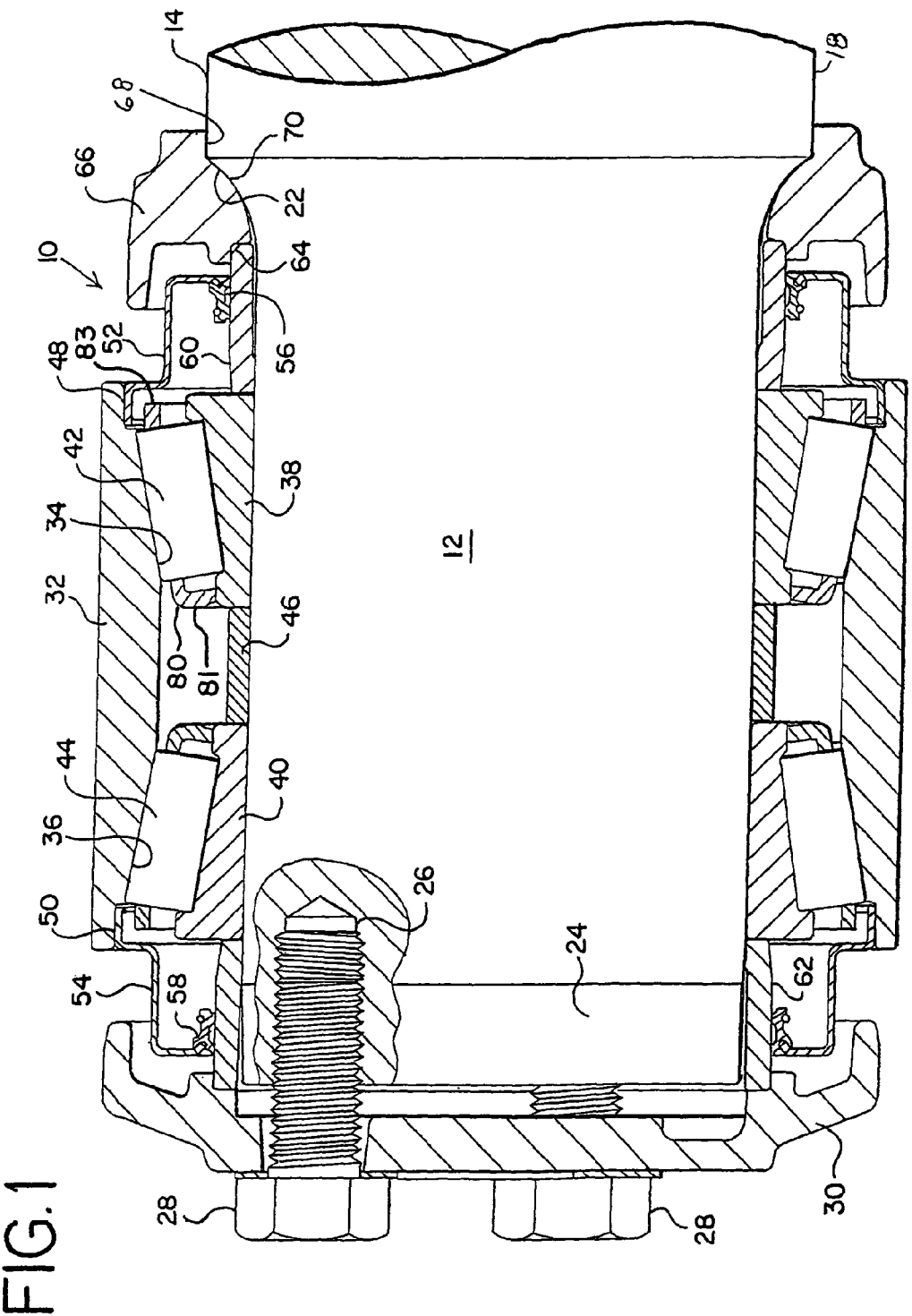
FIG. 1 is a sectional view of a shaft journal having mounted thereon a tapered roller bearing assembly in accordance with the present invention.

Referring now to FIG. 1 of the drawings, a tapered roller bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The tapered roller bearing assembly 10 is preassembled before being mounted and clamped on journal 12 by cap 30. The tapered roller bearing assembly includes a unitary bearing cup or outer raceway 32 having a pair of raceways 34, 36 formed one adjacent each end thereof which cooperate with a pair of bearing cones 38, 40, respectively, to support the two rows of tapered rollers 42, 44, respectively, there between. A center spacer 46 is positioned between cones 38, 40 to maintain the cones in accurately spaced relation relative to one another.

The bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 include resilient sealing elements 56, 58, respectively, which rub upon and form a seal with a pair of seal wear ring sleeves 60, 62, respectively, having their inwardly directed ends in engagement with the outwardly directed ends of bearing cones 38, 40, respectively. The other end of wear ring sleeve 60 is received in a cylindrical counterbore 64 in the axially outwardly directed end of an annular backing ring 66 which, in turn, has a counterbore 68 at its other end which is dimensioned to be received in interference and non-interference relation on the cylindrical shoulder 18 of shaft 14. The counterbore 64 and the outer diameter of wear ring sleeve 60 are also dimensioned to provide an interference fit so that the wear ring is pressed into the backing ring 66 which is accurately machined to provide a contoured inner surface 70 complementary to and engaging the contour of fillet 22 when the bearing is mounted on the shaft. The outwardly directed end of sleeve 62 bears against the retaining cap 30.

Cage 80 is typically a unitary structure comprised of a resin material such as a polymer or nylon resin. Cage 80 further comprises a fiber filler, usually of glass or carbon fiber, usually of at least 10 mm or greater length and with the fiber filler usually comprising at least 25 to 50% of the weight of the resin cage itself.

Cage 80 can be made by an injection molding operation using a polymer or nylon resin. The glass or carbon fiber can be added in a pultrusion process to provide added strength to the resin.

Cage 80 also may be made by an injection molding process using a polymer or nylon resin. The glass or nylon fibers can be added in an in line compounding operation to provide added strength to the resin cage itself.

Cage 80 is seen to be a generally cylindrical structure. Cage 80 is comprised of a generally circular inner ring 81 and a generally circular larger diameter outer ring 83. A plurality of pocket bars 85 extend from inner ring 81 to outer ring 83 to provide structural support between inner ring 81 and outer ring 83.

A plurality of support pocket bars 87 also extend from inner ring 81 to outer ring 83 to provide structural support between inner ring 81 and outer ring 83.

Each pocket bar 85 is seen to comprise a base section 86 of a radial thickness of equal to the radial thickness of inner ring 81. However, each pocket bar 85 has a tapered area 89 wherein the radial thickness decreases to a dimension A, which is less than the radial thickness of base section 86.

Each support pocket bar 87 is seen to comprise a base section 88 of a radial thickness equal to radial thickness of inner ring 81. However, each support pocket bar 87 continues with radial thickness B, which is greater than radial thickness A of pocket bar 85, for most of its length.

Figure 2:
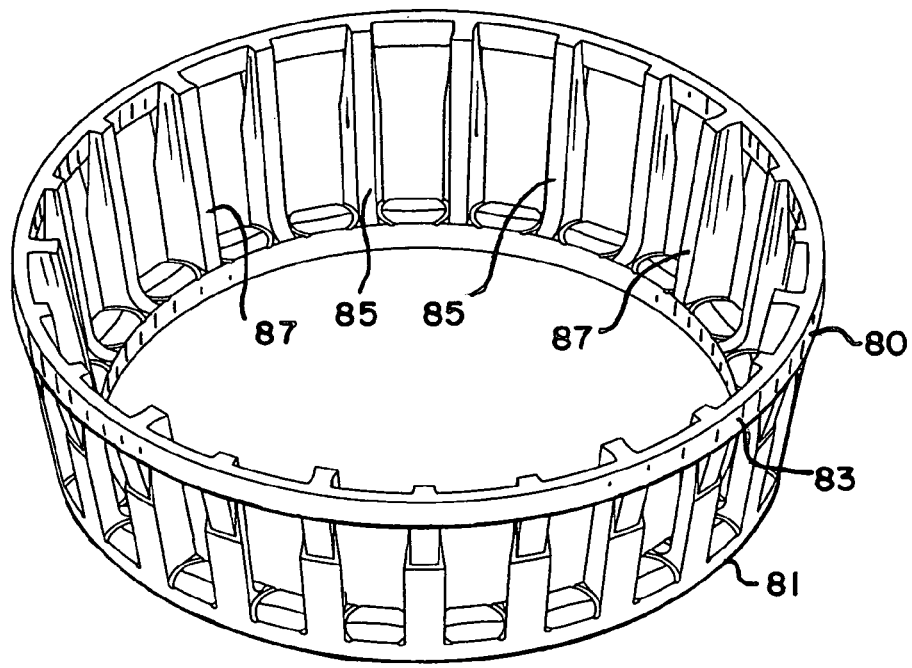
FIG. 2 is a perspective view of a cage for a tapered roller bearing assembly in accordance with an embodiment of the present invention.
Figure 3:
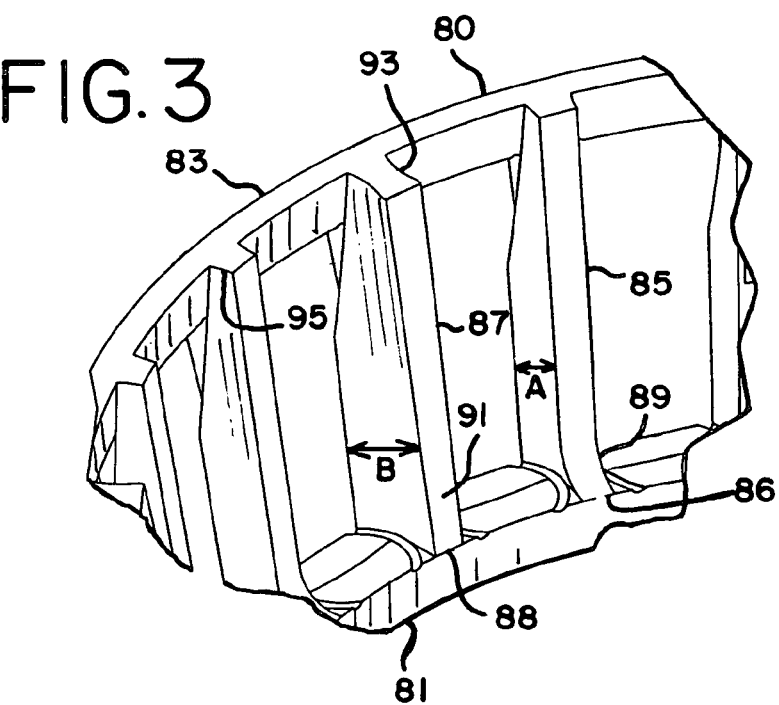
FIG. 3 is a partial, detailed view of a cage for a tapered roller bearing assembly in accordance with an embodiment of the present invention.

In cage 80, it is seen from FIG. 2 that there are a number of pocket bars 85 and support pocket bases 87. Due to the need to allow lubricants to move within tapered roller bearing assembly 10, it is not desirable to have all of the support between inner ring 81 and outer ring 83 in the form of support pocket bars 87. However, having a number of supports in the form of the more robust support pocket bar 87 form allows better alignment of tapered rollers 42 and 44. In the demanding service to which a railway freight car is subjected, tapered rollers 42 and 44 can become skewed or misaligned due to the vibration experienced by bearing 10 in a typical railcar service. Temperatures to which cage 80 are subjected due to the heating of tapered rollers 42 and 44 can also contribute to the vibration rollers 42 and 44 and resulting misalignment of tapered rollers 42 and 44. Even in polymer cages currently in service, the cage pocket bars can move and allow tapered roller misalignment. The improved cage of the present invention reduces the possibilities of such cage vibration and tapered roller misalignment.

In fact, potential cage shake is limited to less than 0.03 inch, mainly due to reduced roller/cage clearances due to improved design and material with lower coefficient of thermal expansion. The lower coefficient of thermal expansion allows for tighter pocket clearances and therefore less cage shake. Less cage shake and tighter pocket clearance reduces the amount of possible roller skewing.

Lower cage shake will result in less roller skewing caused by vibration of the bearing system assembly.

Cage "shake" is the amount of radial movement possible by a cage on a given assembly of rollers and a cone.

Shake is the range of motion allowed in the radial direction of the cage on the inner raceway components.

What is claimed is:

1. A tapered roller bearing assembly comprising,
   an inner race having an outwardly directed raceway thereon, an outer race having an inwardly directed raceway thereon, and tapered roller elements located between and contacting the inner and outer raceways,
   and a cage to provide spacing and alignment for the roller elements,
   the cage having a generally cylindrical structure,
   and comprised of an inner ring and an outer ring,
   and a plurality of pocket bars extending between the inner ring and the outer ring, and a plurality of support pocket bars extending between the inner ring and the outer ring,
   wherein each support pocket bar has an overall thickness greater than an overall thickness of each pocket bar,
   wherein each support pocket bar has a base section attached to the inner ring, wherein an overall thickness of each support pocket bar is, for a majority of its length, about the same as a thickness of the base section of the support pocket bar base section.

2. The tapered roller bearing assembly of claim 1,
   wherein the cage is a generally unitary structure comprised of a resin material with a fill of glass fibers.

3. The tapered roller bearing assembly of claim 2,
   wherein the resin material is a nylon and glass fibers in the fill are generally over 10 mm in length.

4. The tapered roller bearing assembly of claim 2,
   wherein the glass fiber fill comprises at least 25% of the weight of the resin material.

5. The tapered roller bearing of claim 1,
   wherein the cage is injection molded with a nylon resin material filled with at least 25% by weight of glass fibers of at least 10 mm in length.

6. A tapered roller bearing assembly comprising
   an inner race having an outwardly directed raceway thereon,
   an outer race having an inwardly directed raceway therein, and tapered roller elements located between and contacting the inner and outer raceways,
   and a cage to provide spacing and alignment for the roller elements, the case having a generally cylindrical structure and comprised of an inner ring and an outer ring and a plurality of pocket bars extending between the inner ring and the outer ring,
   and a plurality of support pocket bars extending between the inner ring and the outer ring,
   wherein each support pocket bar has an overall thickness greater than an overall thickness of each pocket bar,
   and wherein the cage is a generally unitary structure comprised of a resin material with a fill of glass fibers,
   wherein each support pocket bar has a base section attached to the inner ring, wherein an overall thickness of each support pocket bar is, for a majority of its length, about the same as a thickness of the base section of the support pocket bar base section.

7. The tapered roller bearing assembly of claim 6
   wherein the resin material is a nylon and the glass fibers in the fill are generally over 10 mm in length.

8. The tapered roller bearing assembly of claim 6
   wherein the glass fiber fill comprises at least 25% of the weight of the nylon resin material.

9. The tapered roller bearing of claim 6
   wherein the cage is injection molded with a nylon resin material filled with at least 25% by weight of glass fibers of at least 10 mm in length.

10. The tapered roller bearing assembly comprising
    an inner race having an outwardly directed raceway thereon,
    an outer race having an inwardly directed raceway thereon,
    and tapered roller elements located between and contacting the inner and outer raceways,
    and a cage to provide spacing and alignment for the roller elements, the cage having a generally cylindrical structure and comprised of an inner ring and an outer ring and a plurality of pocket bars extending between the inner ring and the outer ring,
    and a plurality of support pocket bars extending between the inner ring and the outer ring,
    wherein each support pocket bar has a thickness greater than a thickness of each pocket bar,
    and wherein the cage is a generally unitary structure comprised of a nylon resin material with a fill of glass fibers, wherein each pocket bar has a base section attached to the inner ring, and wherein an overall thickness of each pocket bar is less than thickness of the base section of the base section of the pocket bar, and wherein each support pocket bar has a base section attached to the inner ring, wherein an overall thickness of each support pocket bar is, for a majority of its length, about the same as a thickness of the base section of the support pocket bar base section.

11. The tapered roller bearing assembly of claim 10 wherein the potential cage vibration of less than 0.03 inch.

12. The tapered roller bearing assembly of claim 10 wherein the glass fiber fill comprises at least 25% of the weight of the nylon resin material and are generally over 10 mm in length.

13. A tapered roller bearing assembly comprising, an inner race having an outwardly directed raceway thereon, an outer race having an inwardly directed raceway thereon, and tapered roller elements located between and contacting the inner and outer raceways, and a cage to provide spacing and alignment for the roller elements, the cage having a generally cylindrical structure, and comprised of an inner ring and an outer ring, and a plurality of pocket bars extending between the inner ring and the outer ring, and a plurality of support pocket bars extending between the inner ring and the outer ring, wherein each support pocket bar has an overall thickness greater than an overall thickness of each pocket bar, wherein each pocket bar has a base section attached to the inner ring, and wherein an overall thickness of each pocket bar is less than a thickness of the base section of the pocket bar, and wherein each support pocket bar has a base section attached to the inner ring, wherein an overall thickness of each support pocket bar is, for a majority of its length, about the same as a thickness of the section of the support pocket bar base section.

14. A tapered roller bearing assembly comprising, an inner race having an outwardly directed raceway thereon, an outer race having an inwardly directed raceway thereon, and tapered roller elements located between and contacting the inner and outer raceways, and a cage to provide spacing and alignment for the roller elements, the cage having a generally cylindrical structure, and comprised of an inner ring and an outer ring, and a plurality of pocket bars extending between the inner ring and the outer ring, and a plurality of support pocket bars extending between the inner ring and the outer ring, wherein each support pocket bar has an overall thickness greater than an overall thickness of each pocket bar, wherein each pocket bar has a base section attached to the inner ring, and wherein each pocket bar is tapered in its thickness from the base section such that the overall thickness of each pocket bar is less than a thickness of the base section of the pocket bar.

15. A tapered roller bearing assembly comprising an inner race having an outwardly directed raceway thereon, an outer race having an inwardly directed raceway therein, and tapered roller elements located between and contacting the inner and outer raceways, and a cage to provide spacing and alignment for the roller elements, the case having a generally cylindrical structure and comprised of an inner ring and an outer ring and a plurality of pocket bars extending between the inner ring and the outer ring, and a plurality of support pocket bars extending between the inner ring and the outer ring, wherein each support pocket bar has an overall thickness greater than an overall thickness of each pocket bar, and wherein the cage is a generally unitary structure comprised of a resin material with a fill of glass fibers, wherein each pocket bar has a base section attached to the inner ring, and wherein an overall thickness of each pocket bar is less than a thickness of the base section of the pocket bar, and wherein each support pocket bar has a base section attached to the inner ring, wherein an overall thickness of each support pocket bar is, for a majority of its length, about the same as a thickness of the base section of the support pocket bar base section.

16. A tapered roller bearing assembly comprising an inner race having an outwardly directed raceway thereon, an outer race having an inwardly directed raceway therein, and tapered roller elements located between and contacting the inner and outer raceways, and a cage to provide spacing and alignment for the roller elements, the case having a generally cylindrical structure and comprised of an inner ring and an outer ring and a plurality of pocket bars extending between the inner ring and the outer ring, and a plurality of support pocket bars extending between the inner ring and the outer ring, wherein each support pocket bar has an overall thickness greater than an overall thickness of each pocket bar, and wherein the cage is a generally unitary structure comprised of a resin material with a fill of glass fibers, wherein each pocket bar has a base section attached to the inner ring, and wherein each pocket bar is tapered in its thickness from the base section such that the overall thickness of each pocket is less than a thickness of a base section of the pocket bar.

* * * * *